US010339979B2

(12) United States Patent
Aftabjahani et al.

(10) Patent No.: US 10,339,979 B2
(45) Date of Patent: Jul. 2, 2019

(54) SECURE PROTECTION BLOCK AND FUNCTION BLOCK SYSTEM AND METHOD (71) Applicant: Intel Corporation, Santa Clara, CA (US)

(72) Inventors: Seyed-Abdollah Aftabjahani, Portland, OR (US); Amitabh Das, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 548 days.

(21) Appl. No.: 14/746,514

(22) Filed: Jun. 22, 2015

(65) Prior Publication Data
US 2016/0372913 A1 Dec. 22, 2016

(51) Int. Cl.
*H02H 1/00* (2006.01)
*G11C 5/00* (2006.01)
*H02H 3/20* (2006.01)
*H01L 27/02* (2006.01)

(52) U.S. Cl.
CPC ............ *G11C 5/00* (2013.01); *H01L 27/0251* (2013.01); *H02H 3/20* (2013.01); *H02H 3/202* (2013.01)

(58) Field of Classification Search
CPC . H02H 3/20; H02H 3/202; G11C 5/00; H01L 27/0251
See application file for complete search history.

(56) References Cited

U.S. PATENT DOCUMENTS

| 5,349,544 | A | * | 9/1994 | Wright | H03L 7/183 326/39 |
|---|---|---|---|---|---|
| 6,433,616 | B1 | | 8/2002 | Dishongh | |
| 6,903,436 | B1 | * | 6/2005 | Luo | G11C 17/16 257/368 |
| 8,059,375 | B2 | | 11/2011 | Fehle | |
| 8,077,157 | B2 | | 12/2011 | Sengupta | |
| 8,102,632 | B2 | | 1/2012 | Liang | |
| 2006/0186925 | A1 | * | 8/2006 | Chen | H03K 3/356182 326/122 |

(Continued)

OTHER PUBLICATIONS

Clark, CJ, "Anti-tamper JTAG TAP design enable DRM to JTAG registers and P1687 on-chip instruments," IEEE International Symposium on Hardware-Oriented Security and Trust (HOST), 2010, pp. 19-24.

(Continued)

*Primary Examiner* — Zeev V Kitov
(74) *Attorney, Agent, or Firm* — Trop, Pruner & Hu, P.C.

(57) ABSTRACT

An embodiment includes an apparatus comprising: power supply pins to couple to a power supply; a protection block, including a first transistor, to: (a) determine whether voltage from the power supply pins meets a predetermined condition, and (b) in response to determining whether the predetermined condition is met, communicate a first communication to at least one of first and second function blocks; and the first function block, coupled to the protection block and the power supply pins, including a second transistor and at least one fuse that corresponds to a security key; wherein the first transistor is at least one of: (a) connected in series with at least one other transistor, and (b) having a first gate oxide breakdown voltage that is greater than a second gate oxide breakdown voltage of the second transistor. Other embodiments are described herein.

22 Claims, 5 Drawing Sheets (56) References Cited

U.S. PATENT DOCUMENTS

2013/0169153 A1\* 7/2013 Meeks .................. B60R 25/00
                                                              315/77
2014/0334049 A1\* 11/2014 Singh ...................... G11C 7/04
                                                             361/91.5

OTHER PUBLICATIONS

Luh, Louis, et al., "A Zener-Diode-Activ ated ESD Protection Circuit for Sub-Micron CMOS Processes," ISCAS 2000—IEEE International Symposium on Circuits and Systems, May 28-31, 2000, Geneva, Switzerland, pp. V65-V68.

Murdoch, Steven J., et al., "Chip and PIN is Broken," 2010 IEEE Symposium on Security and Privacy, Cambridge, UK, pp. 433-444.

Loh, Kou-Hung, "Circuit Techniques Using Stacked MOS Transistors," IEEE 1993 CH 3381, pp. 1237-1240.

Drimer, Saar, et al., "Failures of Tamper-Proofing in PIN Entry Devices," www.computer.org/security, IEEE Computer and Reliability Societies, Nov. 2009, pp. 39-45.

Azizi, Navid, et al., "Gate Oxide Breakdown," Dec. 2, 2003, 33 pages.

Finco, S., et al., "High Performance NMOS Active Zener and Rectifier Diodes," 2001 IEEE, Instituto Tecnológico para a Informática, SP, Brazil, pp. 658-663.

Mak, Pui-In, et al., "High-/Mixed-Voltage RF and Analog CMOS Circuits Come of Age," IEEE Circuits and Systems Magazine, 2010, pp. 27-39.

Wikipedia, "Time-dependent gate oxide breakdown," https://en.wikipedia.org/wiki/Time-dependent_gate_oxide_breakdown, accessed Apr. 28, 2015, 1 page.

\* cited by examiner

SECURE PROTECTION BLOCK AND FUNCTION BLOCK SYSTEM AND METHOD

BACKGROUND

As presented in U.S. Patent Application Publication Number 2014/0334049 (assigned to Intel Corp. of Santa Clara, Calif.), one-time programmable fuse arrays (e.g., programmable read-only memories) may store various values (fuse values) in a Central Processing Unit (CPU), System-on-a-chip (SoC), and the like. These fuse values may relate to security keys, activation of various CPU/SoC features, and functions such as cache memory size. The fuse values may be programmed using ultra high voltages (e.g., >2.2V), whereas the CPU may operate at a much lower voltage (e.g., 1.0V). In-Field-Programmable (IFP) fuse arrays are one-time programmable fuses used for storing customer specific data (i.e., fuse values). IFP fuse arrays may store specific security keys that devices (e.g., mobile computing nodes such as Smartphones) use to function on a mobile carrier's network, store data that enables or disables various functions and features of the SoC platform, and provide for encryption/decryption, authentication, and the like.

Maliciously accessing or otherwise manipulating fuse values can pose any number of problems, such as improperly unlocking various features in a chip by overriding fuse values or accessing customer security keys. One way of unlocking a processor (e.g., CPU) by disrupting fuse values is through voltage level manipulation. Voltages may be supplied from a motherboard (outside of the die and package) and are, consequently, susceptible to manipulation through physical access of voltage pins. Changing supply voltages affects how much current can flow through a primary fuse cell as well as a reference fuse cell (which is used to develop a voltage differential at sense amplifier inputs). Changing supply voltages can also affect a sensing clock that controls how long a sense amplifier is enabled. Doing so distorts the current voltage values communicated into the fuse sense amplifier. Doing so also can reduce or increase the time required to develop the sense amplifier differential, which in turn can corrupt the fuse values that are being read out depending upon the design.

BRIEF DESCRIPTION OF THE DRAWINGS

Features and advantages of embodiments of the present invention will become apparent from the appended claims, the following detailed description of one or more example embodiments, and the corresponding figures. Where considered appropriate reference labels have been repeated among the figures to indicate corresponding or analogous elements.

DETAILED DESCRIPTION

In the following description, numerous specific details are set forth but embodiments of the invention may be practiced without these specific details. Well-known circuits, structures and techniques have not been shown in detail to avoid obscuring an understanding of this description. "An embodiment", "various embodiments" and the like indicate embodiment(s) so described may include particular features, structures, or characteristics, but not every embodiment necessarily includes the particular features, structures, or characteristics. Some embodiments may have some, all, or none of the features described for other embodiments. "First", "second", "third" and the like describe a common object and indicate different instances of like objects are being referred to. Such adjectives do not imply objects so described must be in a given sequence, either temporally, spatially, in ranking, or in any other manner.

As indicated above, an operator with malicious intent may improperly try to access or manipulate a fuse array or, more generally, a "function block" (regardless of whether the function block uses fuses or some other memory to store values). Regarding function blocks, a SoC may include intellectual property (IP) circuit portions, cores, or blocks ("function blocks") that provide various functionalities required in the system. Function blocks may be digital, analog, and mixed-signal. Each function block may connect to one or more networks such as a reset network, power network, and the like.

To address the aforementioned malicious activities, an embodiment helps deter malicious access and/or manipulation of function blocks by providing a system design approach with increased resistance to such attacks. To that end, Applicant identified various heretofore unknown problems/security vulnerabilities with conventional architectures and has provided embodiments that solve such problems.

For example, Applicant has identified various attack paths that use multiple phases to improperly access function blocks such as, but not limited to, fuse arrays. More specifically, Applicant has discovered an attack that includes: (a) a first phase where a high voltage is used to disable a protection block, and then (b) a second phase is used to access a function block (including a fuse array) that had been protected by the protection block before the protection block itself was disabled in the first phase. A protection block is a block that protects function blocks by, for example, sensing out-of-range supply voltages, temperatures, and the like and then possibly sending alert signals to function blocks so that these function block(s) can alter their activities (e.g., shut down) to combat the irregular conditions.

More specifically and for example, Applicant determined that in a first phase, an over-voltage attack is launched to target one or more of the protection blocks, the attack monitoring blocks (blocks that monitor findings from the protections blocks, such as whether an abnormal voltage has been sensed), and the communication networks between the protection blocks, monitoring blocks, and function blocks. In some cases the protection and monitoring blocks are one and the same. The physical damage from the over-voltage attack may disable a protection block (e.g., by exceeding gate oxide breakdown voltage for transistors within the protection block). This allows a malicious operator to then bypass the protection of the protection block (e.g., a voltage-level detector for a fuse controller that is designed to protect the confidentiality of secrets stored in a fuse array). In a second phase, the attacker takes advantage of the newly formed vulnerability and launches the final attack (e.g., over/under voltage attack) on the function block to compromise, for example, a sensing process for a fuse controller. In the other words, Applicant discovered the security subsystem (and even voltage attack detection blocks) does (do) not protect itself against under/over voltage attacks, and thereby renders the function blocks susceptible to a multi-phase attack.

However, if the above mentioned multi-phase attacks were used against embodiments described herein, the first phase would result in one of several "safe modes" whereby the system (e.g., SoC) disables some or all function blocks to ensure the system either operates safely or not at all, thereby maintaining the secrecy of the function block. For example, a safe mode may allow access to non-critical function blocks but disallow access to function blocks including security keys. A specific embodiment provides a safe mode if the system is targeted by over-voltage and/or under-voltage attacks aimed at bypassing the security provided by one or more protection blocks.

Regarding over-voltage and/or under-voltage attacks in particular, an embodiment improves the built-in security infrastructure of a secure mixed-signal chip (while other embodiments address analog or digital chips) by making the security subsystem resistant to over-voltage and/or under-voltage attacks. An embodiment comprises one or more protection blocks, a central (or distributed) attack monitoring block to monitor outputs/determinations as alarm signals from the protection blocks (which may be combined with one or more protection blocks), and a communication network coupling the protection blocks to the monitoring blocks and function blocks. Embodiments use various methods to provide this improved security such as: (a) adding block-level or chip-level over-voltage and/or under-voltage protection (where there was no previously existing protection) for attack protection blocks and/or attack monitoring subsystem, and/or (b), replacing gates (logic cells) of the protection blocks and/or the monitoring subsystem and their interfaces with an over-voltage tolerant gate system such as (b)(i) thick-gate-oxide transistors, and/or (b)(ii) stacked-transistor configurations.

The above discoveries of vulnerabilities and related solutions may be considered and implemented in a circuit design at any stage of the security design life cycle including the following stages: requirement gathering, architectural design, microarchitectural design, RTL design, circuit validation, and the like. The above mentioned threats may be addressed via threat modeling, which determines the security requirements that should be realized in architecture. Depending on the details of proposed microarchitectures, proper protection blocks (or elements) may be used to address the architectural-level security requirements. The security requirements for protection blocks may be mapped into micro-architectural-level design requirements. Embodiments may use protection blocks that address security requirements for the design at both a digital primitive level (e.g., gate level or cell level) and other low abstraction levels that implement upper abstraction levels (e.g., circuit level, physical level).

Figure 1:
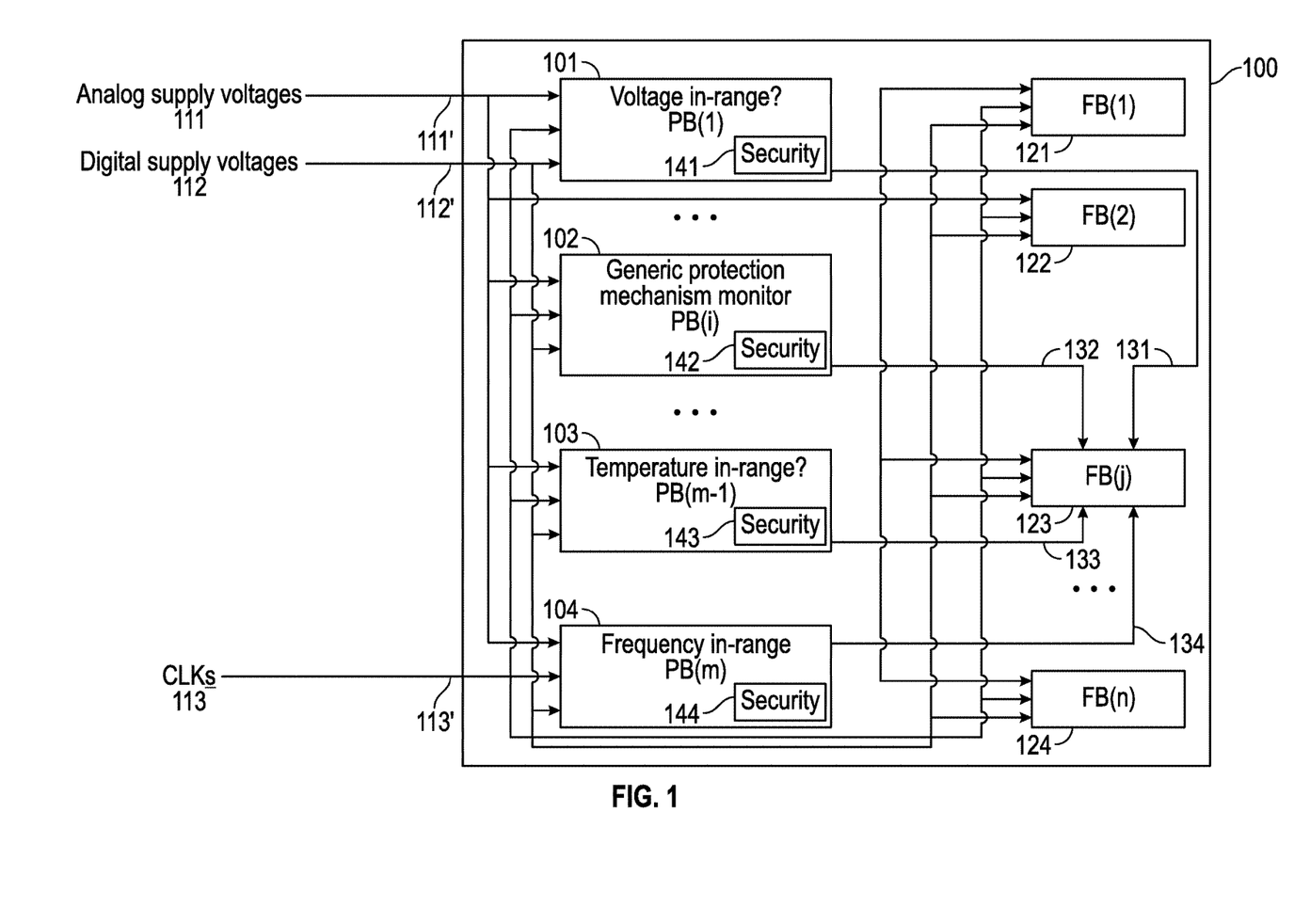
FIG. 1 includes a schematic block diagram of a secure protection block and function block system in an embodiment of the invention.

FIG. 1 includes SoC 100 comprising protection blocks 101, 102, 103, 104 coupled to function blocks 121, 122, 123, 124. The protection and function blocks receive power for their mixed signal circuits from analog power supply 111 via bus/network/interconnects/pins 111'. The protection and function blocks receive power for their digital circuits from digital power supply 112 via bus/network/interconnects/pins 112'. The protection and function blocks receive clock signals from clock(s) 113 via bus/network/interconnects 113'. Protection block 101 determines whether a voltage is within a predetermined range. For example, block 101 may determine whether a voltage is below or above a predetermined range. Block 101 may require such suspect voltage remain outside the desired range for a predetermined period of time or for a predetermined cycles/attempts per unit of time. Protection block 102 is discussed below. Protection block 103 determines whether a temperature for SoC 100 (e.g., ambient temperature for SoC 100) is within a predetermined range. Protection block 104 determines whether a frequency from any or all of sources 101, 103, 104 is within a predetermined range. Any of blocks 101, 103, 104 may communicate an alarm signal to function block 123 via traces/buses/networks 131, 133, 134 should any of blocks 101, 103, 104 determine an abnormal/non-tolerable condition exits. In other words, function block 123 is the central attack monitoring system, which receives the alarm signals 131, 132, 133, 134 from attack protection blocks 101, 102, 103, 104. Upon receiving such a signal function block 123 may enter a safe mode whereby it denies access to its contents or the contents or functioning of other function blocks. The alarm signals may be sent to other function blocks in addition to or instead of block 123.

Protection block 102 includes a "generic protection mechanism monitor" or agent that serves as an access control block based on an access control policy. The policy may include a subset of parameters such as requester (originator), request type (operation), receiver destination ID (server) address, and other control policies that must be satisfied to prevent an error signal from being conveyed to a function block via path 132.

The aforementioned description of FIG. 1 provides a secure system. However, an embodiment supplements this design by providing protection at a primitive level (e.g., gate level or cell level) because these elements of the protection blocks must operate correctly to ensure a secure SoC. Thus, the switching elements (e.g., transistors) themselves, within or critical to protection blocks and/or function blocks, should be protected in embodiments. In other words, since digital elements are implemented using transistors as switching elements, the correct operation of those transistors depends on electrical properties (e.g., supply voltage levels and current levels) and environmental parameters (e.g., temperature and electromagnetic interference) to be within the specification limits that the transistors are designed for. If in phase 1 of an attack, an attacker targets the transistors using electrical properties or environmental parameters out of pre-determined limits for the transistors, even temporarily, the attacker then in phase 2 of the attack has a chance to bypass the security protection blocks and attacks key function blocks no longer protected by the protection blocks.

This "primitive level" protection is provided in various ways in various embodiments. For example, protection blocks may protect themselves using security modules or blocks 141, 142, 143, 144. Security modules or blocks 141, 142, 143, 144 may include transistors that comprise the logic for determining voltage, access rights, temperature, and frequency (a) respectively for blocks 101, 102, 103, 104 or (b) for all or more than one of the blocks. An embodiment includes one primitive level protection block that may include all the protection blocks. For instance, an embodiment includes a generic attack protection monitor block that incorporates a voltage-in-range detector block, a frequency-in-range block, and a temperature-in-range block. The security blocks can also include gates comprising transistors for propagation of the sense and alarm signals inside the blocks. As will be discussed further below, security blocks 141, 142, 143, 144 may include transistors having increased gate oxide thicknesses as compared to transistors included within key function blocks, such as block 123. As a result, the function block 123 would fail (due to maliciously supplied over-voltage) before the protection blocks fail. In other embodiments security blocks 141, 142, 143, 144 may include transistors in a stacked formation to create voltage attack resistant gates (or cells) such that any maliciously supplied over-voltage is divided amongst the stack of transistors in each gate so the function block 123 (not having such a stacked transistor configuration) will fail before the protection blocks fail. Examples of these transistor embodiments (e.g., thick oxide and/or stacked transistors) are addressed below. Further, security blocks 141, 142, 143, 144 constitute modules as that term is defined below, and their boundaries may extend such that their transistor protection mechanisms provide for propagation of alarm signals all the way to function blocks, such as block 123.

Returning to FIG. 1, please note that other signals for power resets, Design for Test (DFT) networks (e.g., scan lines), and the like are not shown to maintain clarity for FIG. 1. Voltage for the operation of analog, digital, and sensor blocks are provided to those blocks by supply voltage nets, which are shown as buses (e.g., buses 111', 112'). However, depending on the power domains that they belong to, the blocks 101, 102, 103, 104, 121, 122, 123, 124 may need to use zero, one, or more supply networks from both digital and analog supplies. In an embodiment, at least one analog voltage line is for analog blocks whereas digital and sensor blocks might need such a line as well. For example, blocks that use their own voltage regulators to make the digital voltage for themselves may be connected to an analog voltage line as well. Moreover, sensor blocks (e.g., block 101) that monitor the level of an input voltage also need to be connected to the analog voltage line.

In an embodiment interconnects provide a communication infrastructure between the blocks. In a secure system, protection blocks use alarm signal paths (similar to paths 131, 132, 133, 134) connected to a central attack block (not present in the embodiment of FIG. 1) that will cease the normal operation of the SoC (or portions/function blocks of the SoC) under attack, log the attacks, and notify an external system to take proper actions. For example, a node of a supercomputer may use any of alarm paths 131, 132, 133, 134 and the like should a protection block be attacked. The alarm signals may alert the rest of the nodes of the system (supercomputer in the example) that operation of the attacked node is not reliable and that the other nodes of the system should be reconfigured to avoid the node under attack for any computation and service (or to repair the node or have it replaced if the problem persists).

Without employing security blocks 141, 142, 143, 144, Applicant has discovered the remainder of SoC 100 may be vulnerable to security attacks. Although the security blocks are shown as boxes within the protection blocks, in an embodiment they include the interfacing logic within a protection block, the logic for propagation of the alarm signal from the protection blocks, the interfacing logic within functional blocks, and the logic that should be protected within monitoring blocks. In other words, without security blocks 141, 142, 143, 144 the protection blocks 101, 102, 103, 104 would not be able to protect themselves against voltage attacks and could be opportunistically disabled by damaging: (a) the gates in the blocks at the output interface of the protection block (e.g. block 102) to a monitoring function block (e.g., block 123), (b) the gates at the input interface of the protection blocks as well as the monitoring function block 123 (e.g., at the input interface of block 102), and/or (c) the gates that propagate the alarm signals 131, 132, 133, 134 from the output interface of the protection blocks to the input interface of the monitoring block(s) (e.g., block 123, which may or may not include an array of fuses). Such attacks may target the actual function blocks (and not the protection blocks), but not necessarily all of the function blocks. This may be the case when only one of the function blocks is of interest to the hacker. The target function block may store secrets and the like. Therefore, a partially damaged system (where not all function blocks are disabled) could still be useful for the attacker to extract secrets.

Even with protection blocks (101, 102, 103, 104), without employing security blocks 141, 142, 143, 144, Applicant has discovered the remainder of SoC 100 may be vulnerable to other security attacks. Although the security blocks are shown as boxes within the protection blocks, in an embodiment they include the interfacing logic within a protection block, the logic for propagation of the alarm signal from the protection blocks, the interfacing logic within functional blocks, and the logic that should be protected within monitoring blocks. The result of such an attack could be damage to one or more digital primitives (gates or cells) of the system. Some of the possible outcomes are as follows.

A first scenario exists whereby neither the target protection block (e.g., block 101) nor the function blocks (e.g., 121, 122, 123, 124) are damaged. The attacker would then need to launch the voltage attack again and possibly stress the system at a higher voltage level and/or for a longer time.

A second scenario exists whereby the target protection block (e.g., block 101) is not damaged and is still enabled, but one of the function blocks (e.g., 121, 122, 123, 124) is damaged. In this case, the attacker can launch another attack to defeat the protection block.

A third scenario exists whereby the target protection block (e.g., block 101) is damaged and disabled but the function blocks are not damaged. This is the ideal case for an attacker because protection of the function block is now bypassed and the system is fully operational.

A fourth scenario exists whereby the target protection block is damaged and disabled and one or more function blocks are damaged. If the function block of interest is damaged the protection is bypassed and the system is still partially operational (albeit to what level depends on which function blocks are damaged). If the target function block is disabled, the attacker needs another sample part to hack.

Considering the above four outcomes, a skilled hacker can use the following method to achieve a partly-operational system. Applicant has discovered the steps that a skilled adversary can take are as follows.

First, the hacker conducts experiments to explore the power network (e.g., networks 111, 111', 112, 112') which are quite numerous and complex in modern SoCs. Such experiments may help the hacker understand the power domain connections and possible weaknesses based on the hacker performing a "full-factorial design" (testing all possible voltage pin combinations to determine which will destroy a protection block but not a desired function block). Second, the hacker decreases the voltage pins or a subset of them if targeting the attack only to digital circuits (i.e. digital supply 112 pins) one at a time or in combinations. Performing such an exploration is a nondestructive test that can be repeated as many times as needed. Third, the hacker locates supply pins communicating with a digital interface of analog or sensor protection blocks and/or propagation logic of the alarm signal(s) and then attacks those supply pins in particular, if they are vulnerable. Fourth, the hacker increases and/or decreases voltages of selected digital supply pins to stress out the system moderately to cause partial failures. Fifth, the hacker determines whether the target protection has been bypassed to make the system a partially operational system (as described above).

To address these discovered attack modes, an embodiment (such as the embodiment of FIG. 1) mitigates the security vulnerabilities at an architectural level (e.g., having protection blocks to protect function blocks) and a digital-design level (e.g., using transistor-level methods to make the protection blocks resilient against voltage attacks). The embodiment ensures the protection block primitives (e.g., transistors/gates) are protected. Embodiments address this by: (a) adding block-level and/or chip-level over-voltage and under-voltage protection for protection blocks and the attack monitoring subsystem, and/or (b) replacing gates (or logic cells) of the protection blocks and the monitoring subsystem and their interfaces with their over-voltage tolerant versions, such as (b)(i) thick-gate-oxide transistors, and/or (b)(ii) stacked-transistors.

Returning to FIG. 1, SoC 100 includes power supply pins to couple to a power supply. This may include pins 111' and/or 112' and supplies 111 and/or 112. SoC 100 further includes protection block 101, including a first transistor (see FIGS. 2 and 3), to determine whether voltage from the power supply pins meets a predetermined condition. For example, block 101 may determine whether a voltage supplied to protection block 101 in addition to function block 123 is above a first threshold but below a second threshold. This may be based on an absolute value of the voltage such that voltage reading is polarity agnostic. In response to block 101 determining whether the predetermined condition is met, block 101 may communicate a first communication to at least one of first and second function blocks. Thus, an alarm may be sent via path 131 to function block 123 and/or via paths (not shown) to function blocks 121, 122, and/or 124. The function block 123, coupled to the protection block 101 and the power supply pins (111' and/or 112'), may include a second transistor and at least one fuse (see FIGS. 2 and 3) that corresponds to a security key.

Figure 2:
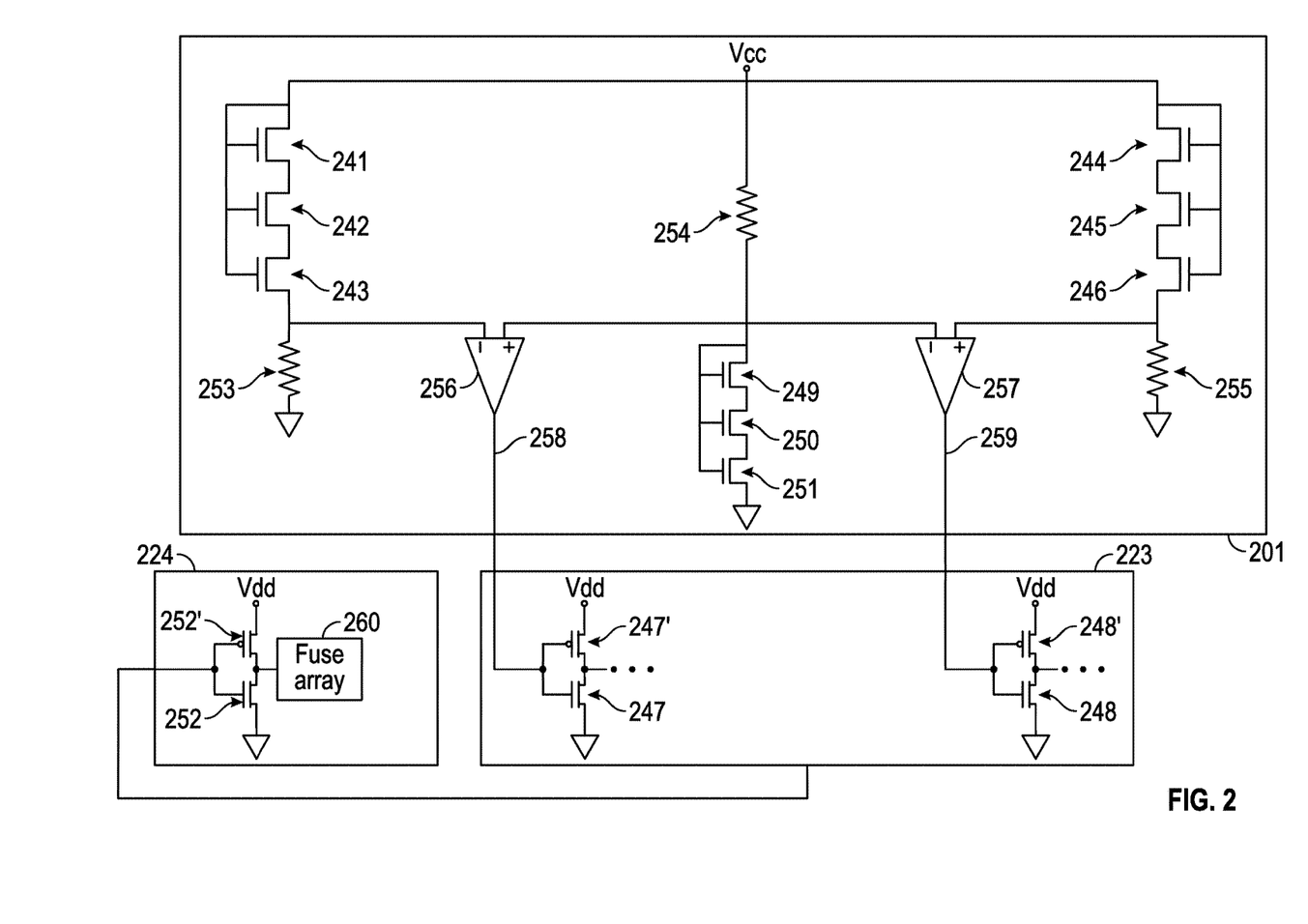
FIG. 2 includes a schematic block diagram of a secure protection block and function block system in an embodiment of the invention.

FIG. 2 provides a hybrid model to mitigate analog voltage attacks to (a) a digital voltage that the fuse module uses, which is derived from the Vcc analog voltage, and (b) digital voltage attacks to Vdd. The embodiment of FIG. 2 includes a schematic block diagram of a secure protection block and function block system in an embodiment of the invention. Protection block 201 includes a first voltage divider (including stacked transistors 241, 242, 243 and resistor 253) and a second voltage divider (including stacked transistors 249, 250, 251 and resistor 254) communicating with comparator 256, which provides a low voltage signal 258 when the signal at its positive node is greater than the signal at its negative node. A comparator is a device that compares two voltages or currents and outputs a signal indicating which is larger. Protection block 201 includes a third voltage divider (including stacked transistors 244, 245, 246 and resistor 255) and the second voltage divider (including stacked transistors 249, 250, 251 and resistor 254) communicating with comparator 257, which provides a high voltage signal 259 when the signal at its positive node is greater than the signal at its negative node. Low and high voltage signals communicate with access transistors 247, 247', 248, 248' of function block 223, which may include logic to monitor signals 258, 259 and disallow operation of other function blocks, such as function block 224 (fuse array 260 within function block 224), within which its transistors are shown for the function block's input interface. Please note the fuse array includes the essential logic for its security sensitive operations and the rest of logic can reside outside array 260 but inside function block 224 (where this other logic does not handle security sensitive operations and therefore need not be protected as vigorously as other logic described herein). Access transistors 252 and 252' constitute an inverter for function block 224 to protect the fuse array 260 against over and under voltage attacks. Thus, this hybrid embodiment employs both stacked transistors (e.g., stacked transistors 241, 242, 243) and thick gate oxide transistors (e.g., transistors 252, 252, 247, 247', 248, 248') to provide protection to fuse array 260. The use of " . . . " in FIG. 2 and other figures simply means other circuit components known to those of ordinary skill in the art may be used between components, such as module 223 and module 224. The " . . . " circuitry between the inverters of block 223 to the inverter of block 224 are also protected with thick gate oxide because they constitute alarm propagation logic.

Thus, according to FIG. 1 both analog and digital supply voltages are provided in some embodiments. Also, the supply voltage for fuse array 260, 360 is derived from Vcc (analog supply voltage). Here, a protection block (e.g., voltage in-range block 101, 201, 301) is used to create an alarm signal to propagate through its security block (e.g., block 141 in FIG. 1 and blocks 201, 301 in FIGS. 2-4) and propagation logic. An embodiment protects fuse array 260, 360 against a voltage attack.

In an embodiment, stacked transistors are used to protect against a voltage attack related to an analog supply voltage source and thick-gate transistors are used to protect against a voltage attack related to a digital supply voltage source. A fuse array uses a digital voltage derived from the analog voltage (but not the original voltage source of Vdd).

Figure 3:
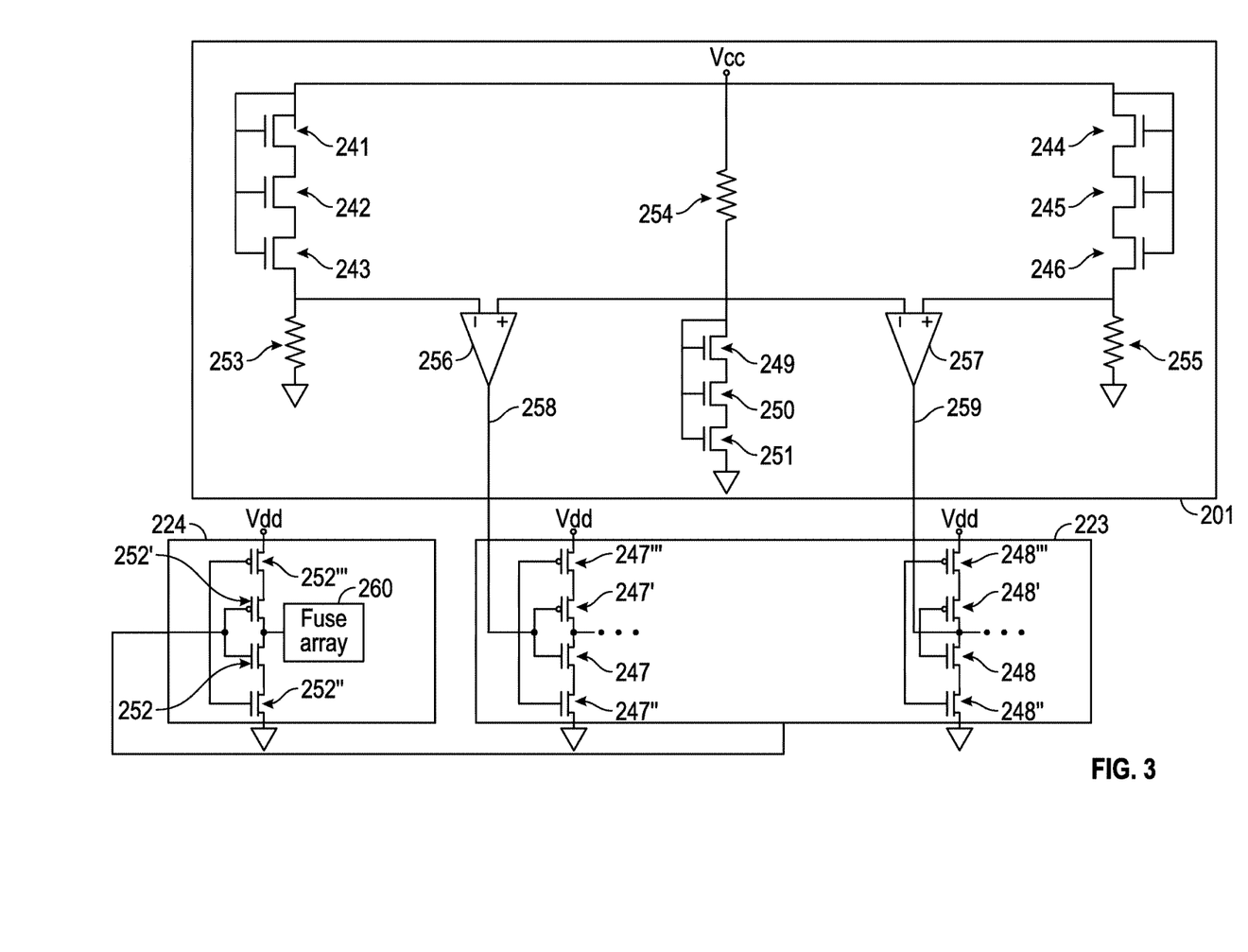
FIG. 3 includes a schematic block diagram of a secure protection block and function block system in an embodiment of the invention.

FIG. 3 includes a schematic block diagram of a secure protection block and function block system in an embodiment of the invention. Protection block 201 includes a first voltage divider (including stacked transistors 241, 242, 243 and resistor 253) and a second voltage divider (including stacked transistors 249, 250, 251 and resistor 254) communicating with comparator 256, which provides a low voltage signal 258 when the signal at its positive node is greater than the signal at its negative node. Protection block 201 includes a third voltage divider (including stacked transistors 244, 245, 246 and resistor 255) and the second voltage divider (including stacked transistors 249, 250, 251 and resistor 254) communicating with comparator 257, which provides a high voltage signal 259 when the signal at its positive node is greater than the signal at its negative node. Low and high voltage signals communicate with access transistors 247, 247', 247", 247''' constituting a first inverter, and 248, 248', 248", 248''' constituting a second inverter of function block 223, which may include logic to monitor signals 258, 259 and disallow operation of other function blocks, such as function block 224 having access transistors 252, 252', 252" and 252''' constituting the inverter of function block 224 to protect the fuse array 260 against over and under voltage attacks.

The use of stacked transistors (e.g., transistors 241, 242, 243) ensures function block 201 will only fail due to analog voltage attack after function blocks 223 and/or 224 (which do not have stacked transistors except the security-related control and propagating logic such as the gates built with stacked transistors 247, 247', 247", 247''', 248, 248', 248", 248''' in block 223 and 252, 252', 252'', 252''' in block 224) fail. Thus, for the analog supply, when the voltage of the power supply pins does not meet the predetermined condition the protection block enters a secure mode of operation. With use of stacked transistors the voltage applied to each of the stacked transistors is inversely proportional to the number of transistors in the stack. The transistors of FIG. 2 may be CMOS transistors but are not necessarily so in other embodiments. While various stacks (such as the stack including transistors 241, 242, 243), have 3 transistors, other embodiments may use 2, 4, 6, 8 or more transistors to attenuate voltage.

The use of stacked transistors (e.g., 247, 247', 247'', 247''', 248, 248', 248'', 248''' in block 223 and 252, 252', 252'', 252''' in block 224) ensures function block 201 will only fail due to digital voltage attack after the rest of the logic within them not being protected against voltage attacks (not shown in the picture). With use of stacked transistors the voltage applied to of each of the stacked transistors is inversely proportional to the number of transistors in the stack. While various stacks, such as the stack including transistors 247, 247', 247'', 247''', 248, 248', 248'', 248''' in block 223 and 252, 252', 252'', 252''' in block 224 have 4 transistors for the inverters shown, other embodiments may use, 6, 8, 10 or more transistors to attenuate voltage.

Thus, FIG. 3 provides an embodiment with power supply pins (not shown) to couple to a power supply (Vdd); a protection block 201, including a first transistor 241, to determine whether voltage from the power supply pins meets a predetermined condition (e.g., above or below a voltage threshold), and in response to determining whether the predetermined condition is met, communicates a first communication (e.g., signal 258) to at least one of first (block 224) and second function blocks (block 223); and the first function block (block 224), coupled to the protection block 201 (via Vdd power supply) and the power supply pins (via Vdd power supply), including a second transistor 252 and at least one fuse (array 260) that corresponds to a security key; wherein the first transistor 241 is connected in series with at least one other transistor.

In an embodiment block 201 includes at least one Zener diode. For example, the Zener diode may be in parallel with stacked transistors 241, 242, and 243 (the drain terminal of 241 and the source terminals of 243). The Zener diode is configured to prevent a voltage that does not meet a predetermined condition from being applied to the protection block 201. Zener diodes are a special type of semiconductor diode that allow current to flow in one direction only and that also allow current to flow in the opposite direction, but only when exposed to enough voltage. An embodiment uses two Zener diodes, oppositely oriented in series, but in parallel with the drain and source terminals of transistor 241 which provides a symmetric limit on the excursion of a signal from ground. This configuration also serves as a transient suppressor.

In an embodiment blocks 223 and 224 (of FIG. 2 or 3) includes at least one Zener diode. For example, the Zener diode may be in parallel with digital power supply to ground path (Vdd to Gnd) upper terminal of transistor 247''' and lower terminal 247''. The Zener diode is configured to prevent a voltage that does not meet a predetermined condition from being applied to unprotected logic in blocks 223 and 224. An embodiment uses two Zener diodes, oppositely oriented in series, but in parallel with digital power supply to ground path (Vdd to Gnd) upper terminal of transistor 247''' and lower terminal 247'', which provides a symmetric limit on the excursion of a signal from ground. This configuration also serves as a transient suppressor.

In the embodiment of FIG. 3 the first transistor 241 has a gate oxide equal in thickness to a gate oxide of the second transistor 252 (i.e., neither has thick gate oxide such as transistor 252 of FIG. 2).

Figure 4:
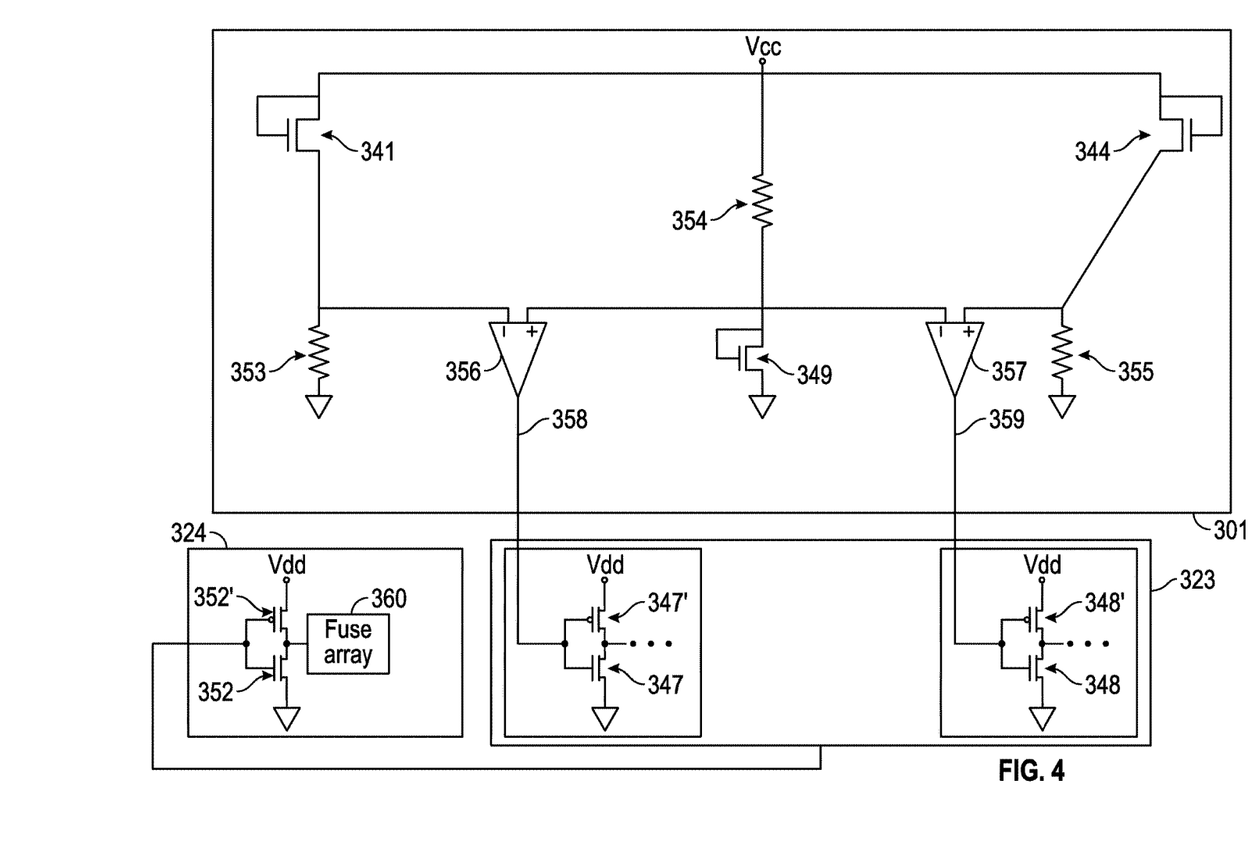
FIG. 4 includes a schematic block diagram of a secure protection block and function block system in an embodiment of the invention.

FIG. 4 includes a schematic block diagram of a secure system comprising protection block(s) and function block(s) in an embodiment of the invention. Protection block 301 includes a first voltage divider (including transistors 341 and resistor 353) and a second voltage divider (including transistor 349 and resistor 354) communicating with comparator 356, which makes the output voltage of signal 358 low when the signal at its positive node is greater than the signal at its negative node. Protection block 301 includes a third voltage divider (including transistor 344 and resistor 355) and the second voltage divider communicating with comparator 357, which makes the output voltage of signal 359 high when the signal at its positive node is greater than the signal at its negative node. Low and high voltage signals communicate with access transistors 347, 347', 348, 348' of function block 323, which may include logic to monitor signals 358, 359 and disallow operation of other function blocks, such as function block 324 having access transistors 352, 352' and fuse array 360, when low or high voltage conditions are present.

Digital supply voltages can be: (a) derived from analog supply voltage, and (b) the same as its upper level digital supply by connecting power-ground pins to the upper level rails or pins.

For case (a) of the above, the first transistor 341 has a first gate oxide breakdown voltage that is greater than a second gate oxide breakdown voltage of the second transistor 352 and the first transistor 341 has a gate oxide that is thicker than a gate oxide of the second transistor 352.

For case (b) of the above, the first transistor 347 and second transistor 347', third transistor 348 and fourth transistor 348' of block 323 have a first gate oxide breakdown voltage that is greater than a second gate oxide breakdown voltage of a fifth transistor 352 and sixth transistor 352' of block 324. This ensures that the security subsystem in block 323 fails only after the failure of 324 in case of digital voltage attack.

For case (b) of the above, the first transistor 347 and second transistor 347', third transistor 348 and fourth transistor 348', a fifth transistor 352 and sixth transistor 352' of blocks 323 and 324 have a first gate oxide breakdown voltage that is greater than a second gate oxide breakdown voltage of the rest of none-security related logic within blocks. This ensures that the security subsystem in block 323 and 324 fails only after the failure of all non-security related logic in case of digital voltage attack.

As used herein, gate-oxide breakdown is defined as the time when a cluster of connected bonds, beginning from a "seed" at one interface of the gate-oxide reaches the opposite interface. Gate-oxide breakdown begins when traps form in the gate-oxide. At first the traps are non-overlapping and thus do not conduct, but as more and more traps are created in the gate-oxide, traps start to overlap creating a conduction path. Once these traps form a conduction path from the gate to the channel, breakdown occurs. This type of breakdown is called Soft Breakdown (SBD). Once there is conduction, new traps are created by thermal damage, which in turn allows for increased conductance. The cycle of conduction leading to increased heat to increased conduction leads to thermal runaway and finally to a lateral propagation of the breakdown spot. The silicon within the breakdown spot starts to melt, and oxygen is released, and a silicon filament is formed in the breakdown spot. This type of breakdown is called Hard Breakdown (HBD). As used herein, "gate oxide breakdown voltage" is the voltage needed, over a spontaneous/transient period of time or a relatively prolonged period of time, needed to cause HBD.

The prolonged period of time may be related to time-dependent gate oxide breakdown (or time-dependent dielectric breakdown, TDDB) which is a failure mechanism in MOSFETs, when the gate oxide breaks down as a result of long-time application of relatively low electric field (as opposite to immediate breakdown, which is caused by strong electric field). The breakdown is caused by formation of a conducting path through the gate oxide to substrate due to electron tunneling current, when MOSFETs are operated close to or beyond their specified operating voltages.

When gate-oxide-breakdown voltages are compared, the time period and temperature should be consistent for both applied voltages. In other words, to determine gate-oxide breakdown voltages for two transistors, one would not compare the effects of application of an instantaneous voltage to one transistor with that of a prolonged voltage to another transistor. In addition, one should not compare the effects of the application of a voltage for one transistor at temperature 1 with that of another transistor at temperature 2.

For case (a) described above, in the embodiment of FIG. 4, when the voltage of the power supply pins exceeds the second gate oxide breakdown voltage of transistor 352 but not the first gate oxide breakdown voltage of transistor 341, the protection block 301 enters a secure mode of operation and forces the secure operation of 324. This may entail block 301 continuing to operate and be accessible while another block (e.g., block 324) is no longer accessible for a short or long term.

For case (a) described above, in the embodiment of FIG. 4, when the voltage of the power supply pins exceeds the first and second gate oxide breakdown voltages (of transistors 341, 352) the protection block 301 enters a failure mode (fails) as transistor 341 is no longer operational.

For case (a) described above, in the embodiment of FIG. 4 when the voltage of the power supply pins exceeds the second gate oxide breakdown voltage of transistor 352 but not the first gate oxide breakdown voltage of transistor 341, the protection block 301 enters a secure mode of operation and communicates with at least one of the second function block 323 and a possible third function block (not shown) but not the first function block 324. This may allow some functionality but prevent a hacker from accessing the fuse array 360.

For case (a) described above, FIG. 4 provides an embodiment with power supply pins (not shown) to couple to a power supply (Vdd); a protection block 301, including a first transistor 341, to determine whether voltage from the power supply pins meets a predetermined condition (e.g., above or below a voltage threshold), and in response to determining whether the predetermined condition is met, communicate (e.g., triggers) a first communication (e.g., alarm signal 358) to at least one of first (block 324) and second function blocks (block 323); and the first function block (block 324), coupled to the protection block 301 (via Vdd power supply) and the power supply pins (via Vdd power supply), including a second transistor 352 and at least one fuse (array 360) that corresponds to a security key; wherein the first transistor has a first gate oxide breakdown voltage that is greater than a second gate oxide breakdown voltage of the second transistor 352.

For case (a) described above, in an embodiment block 301 includes at least one Zener diode to protect against analog voltage attack. For example, the Zener diode may be in parallel with the drain and source terminals of transistor 341. An embodiment uses two Zener diodes, oppositely oriented, in series, but in parallel with the drain and source terminals of transistor 341, which provides a symmetric limit on the excursion of a signal from ground. This configuration also serves as a transient suppressor.

In an embodiment block 323 includes at least one Zener diode to protect against digital voltage attack. For example, the Zener diode may be in parallel with digital power supply to ground path (Vdd to Gnd) upper terminal of transistor 347' and lower terminal 347. An embodiment uses two Zener diodes, oppositely oriented, in series, but in parallel with the drain and source terminals of transistor 341, which provides a symmetric limit on the excursion of a signal from ground. This configuration also serves as a transient suppressor.

Embodiments described herein may protect the confidentiality of secrets stored in fuse arrays (e.g., cryptographic keys and passwords) against voltage attacks by using over-voltage and under-voltage protection blocks that they themselves have protection for under and over voltage attacks. Some embodiments ensure protection blocks fail only after some or all function blocks sharing the same voltage supply as the protection block have failed. In the other words, an attacker (that attacks the voltage detection/protection blocks with an intention to opportunistically disable them and bypass the over/under-voltage protection scheme) will cause the function blocks to fail earlier than the protection blocks. This results in a "security-safe" failure (no secrets can be exposed) that ensures no security-bypassed partly operational system will exist with which to launch a voltage attack (to extract secrets).

For purposes of the embodiments, transistors are metal oxide semiconductor (MOS) transistors, which include drain, source, gate, and bulk terminals. The transistors also include Tri-Gate and FinFet transistors. Source and drain terminals may be identical terminals and are interchangeably used herein. Those skilled in the art will appreciate that other transistors, for example, Bi-polar junction transistors—BJT PNP/NPN, BiCMOS, CMOS, eFET, etc., may be used without departing from the scope of the disclosure.

Embodiments discussed herein may utilize or be utilized in a system such as the system of FIG. 5, discussed below. Such a system may use the protection blocks and function blocks described herein.

Program instructions may be used to cause a general-purpose or special-purpose processing system (such as the system of FIG. 5) that is programmed with the instructions to perform the operations described herein. These instructions may form part of a control system software used to control and monitor the alarm signals between protection blocks and function blocks. These control and monitoring operations may be performed by specific hardware components that contain hardwired logic for performing the operations, or by any combination of programmed computer components and custom hardware components. The methods described herein may be provided as (a) a computer program product that may include one or more machine readable media having stored thereon instructions that may be used to program a processing system or other electronic device to perform the methods or (b) at least one storage medium having instructions stored thereon for causing a system to perform the methods. The term "machine readable medium" or "storage medium" used herein shall include any medium that is capable of storing or encoding a sequence of instructions (transitory media, including signals, or non-transitory media) for execution by the machine and that cause the machine to perform any one of the methods described herein. The term "machine readable medium" or "storage medium" shall accordingly include, but not be limited to, memories such as solid-state memories, optical and magnetic disks, read-only memory (ROM), programmable ROM (PROM), erasable PROM (EPROM), electrically EPROM (EEPROM), a disk drive, a floppy disk, a compact disk ROM (CD-ROM), a digital versatile disk (DVD), flash memory, a magneto-optical disk, as well as more exotic mediums such as machine-accessible biological state preserving or signal preserving storage. A medium may include any mechanism for storing, transmitting, or receiving information in a form readable by a machine, and the medium may include a medium through which the program code may pass, such as antennas, optical fibers, communications interfaces, etc. Program code may be transmitted in the form of packets, serial data, parallel data, etc., and may be used in a compressed or encrypted format. Furthermore, it is common in the art to speak of software, in one form or another (e.g., program, procedure, process, application, module, logic, and so on) as taking an action or causing a result. Such expressions are merely a shorthand way of stating that the execution of the software by a processing system causes the processor to perform an action or produce a result.

A module or block as used herein refers to any hardware, software, firmware, or a combination thereof. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices. However, in another embodiment, logic also includes software or code integrated with hardware, such as firmware or micro-code.

Figure 5:
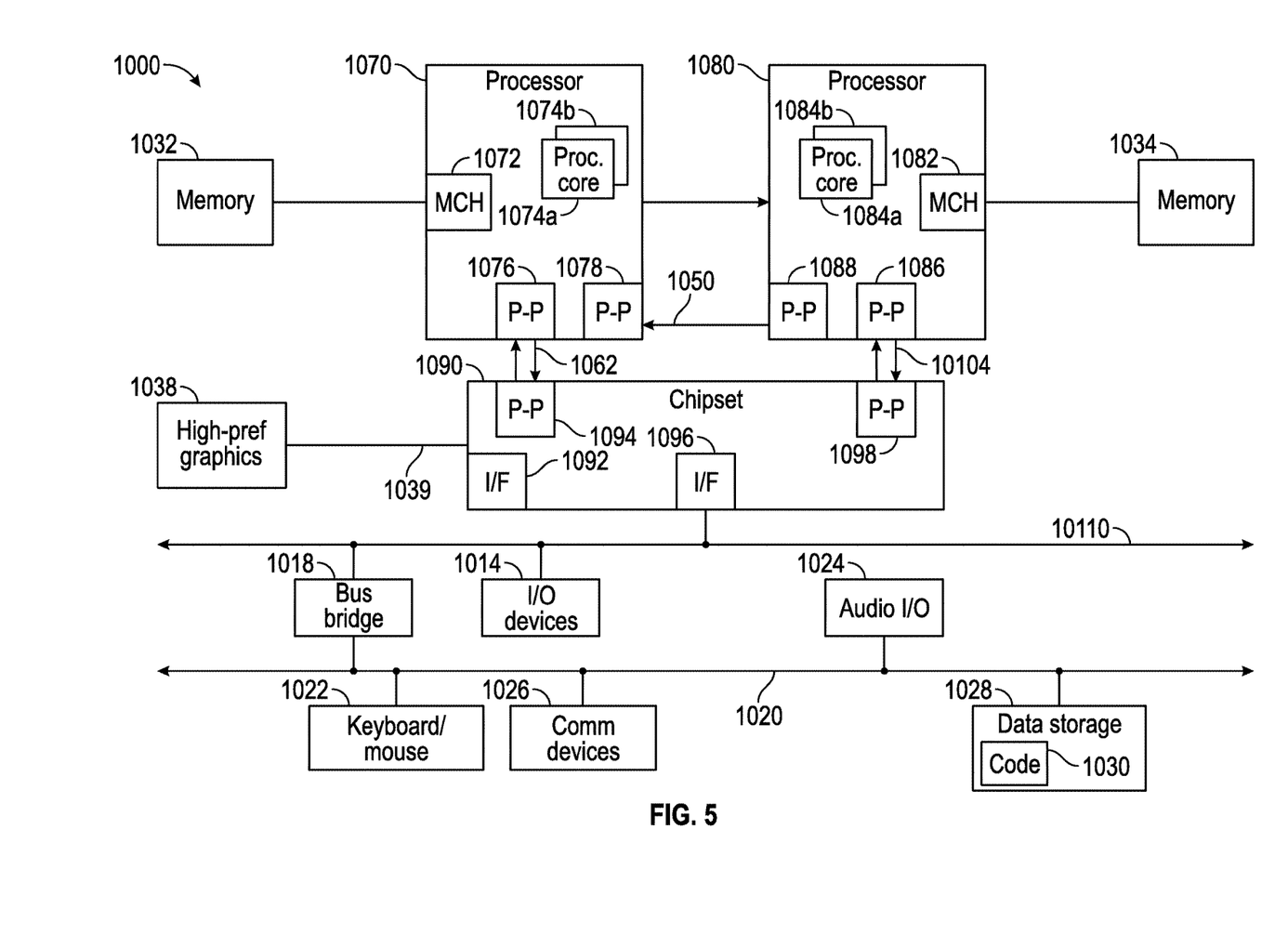
FIG. 5 includes a system for use with an embodiment of the invention.

Referring now to FIG. 5, shown is a block diagram of a system embodiment 1000 in accordance with an embodiment of the present invention. System 1000 may be included in, for example, a mobile computing node such as a cellular phone, smartphone, tablet, Ultrabook®, notebook, laptop, personal digital assistant, and mobile processor-based platform. System 1000 may include functions blocks and security blocks (e.g., block 141) as described herein to enhance security for the system.

Shown is a multiprocessor system 1000 that includes a first processing element 1070 and a second processing element 1080. While two processing elements 1070 and 1080 are shown, it is to be understood that an embodiment of system 1000 may also include only one such processing element. System 1000 is illustrated as a point-to-point interconnect system, wherein the first processing element 1070 and second processing element 1080 are coupled via a point-to-point interconnect 1050. It should be understood that any or all of the interconnects illustrated may be implemented as a multi-drop bus rather than point-to-point interconnect. As shown, each of processing elements 1070 and 1080 may be multicore processors, including first and second processor cores (i.e., processor cores 1074a and 1074b and processor cores 1084a and 1084b). Such cores 1074, 1074b, 1084a, 1084b may be configured to execute instruction code in a manner similar to methods discussed herein.

Each processing element 1070, 1080 may include at least one shared cache. The shared cache may store data (e.g., instructions) that are utilized by one or more components of the processor, such as the cores 1074a, 1074b and 1084a, 1084b, respectively. For example, the shared cache may locally cache data stored in a memory 1032, 1034 for faster access by components of the processor. In one or more embodiments, the shared cache may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the present invention is not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, microarchitectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

First processing element 1070 may further include memory controller logic (MC) 1072 and point-to-point (P-P) interfaces 1076 and 1078. Similarly, second processing element 1080 may include a MC 1082 and P-P interfaces 1086 and 1088. MC's 1072 and 1082 couple the processors to respective memories, namely a memory 1032 and a memory 1034, which may be portions of main memory locally attached to the respective processors. While MC logic 1072 and 1082 is illustrated as integrated into the processing elements 1070, 1080, for alternative embodiments the MC logic may be discreet logic outside the processing elements 1070, 1080 rather than integrated therein.

First processing element 1070 and second processing element 1080 may be coupled to an I/O subsystem 1090 via P-P interfaces 1076, 1086 via P-P interconnects 1062, 10104, respectively. As shown, I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, a bus may be used to couple graphics engine 1038 to I/O subsystem 1090. Alternately, a point-to-point interconnect 1039 may couple these components.

In turn, I/O subsystem 1090 may be coupled to a first bus 10110 via an interface 1096. In one embodiment, first bus 10110 may be a Peripheral Component Interconnect (PCI) bus, or a bus such as a PCI Express bus or another third generation I/O interconnect bus, although the scope of the present invention is not so limited.

As shown, various I/O devices 1014, 1024 may be coupled to first bus 10110, along with a bus bridge 1018 which may couple first bus 10110 to a second bus 1020. In one embodiment, second bus 1020 may be a low pin count (LPC) bus. Various devices may be coupled to second bus 1020 including, for example, a keyboard/mouse 1022, communication device(s) 1026 (which may in turn be in communication with a computer network), and a data storage unit 1028 such as a disk drive or other mass storage device which may include code 1030, in one embodiment. The code 1030 may include instructions for performing embodiments of one or more of the methods described above. Further, an audio I/O 1024 may be coupled to second bus 1020.

Note that other embodiments are contemplated. For example, instead of the point-to-point architecture shown, a system may implement a multi-drop bus or another such communication topology. Also, the elements of FIG. 5 may alternatively be partitioned using more or fewer integrated chips than shown in the FIG. 5.

Example 1a includes an apparatus comprising: power supply pins to couple to a power supply; a protection block, including a first transistor, to: (a) determine whether voltage from the power supply pins meets a predetermined condition, and (b) in response to determining whether the predetermined condition is met, communicate a first communication to at least one of first and second function blocks; and the first function block, coupled to the protection block and the power supply pins, including a second transistor and at least one fuse that corresponds to a security key; wherein the first transistor is at least one of: (a) directly connected with at least one other transistor, and (b) having a first gate oxide breakdown voltage that is greater than a second gate oxide breakdown voltage of the second transistor.

By "directly connected" the first transistor is connected to the "at least one other transistor" using an interconnect or trace but is not indirectly coupled to the "at least one other transistor" using another transistor and the like. For example, two adjacent transistors (e.g., transistors 241, 242) in the stacked transistors of FIG. 2 are directly connected to each other.

In example 2a the subject matter of Example 1a can optionally include wherein when the predetermined condition is based on whether the voltage is within a predetermined range.

In example 3a the subject matter of Examples 1a-2a can optionally include wherein when the predetermined condition is based on whether an absolute value of the voltage is within a predetermined range.

In example 4a the subject matter of Examples 1a-3a can optionally include wherein the protection block includes at least one Zener diode.

In example 5a the subject matter of Examples 1a-4a can optionally include wherein the Zener diode is configured to prevent a voltage that does not meet the predetermined condition from being supplied to the protection block.

In example 6a the subject matter of Examples 1a-5a can optionally include wherein the power supply is a digital power supply or analog power supply.

In example 7a the subject matter of Examples 1a-6a can optionally include wherein the first transistor has a first gate oxide breakdown voltage that is greater than a second gate oxide breakdown voltage of the second transistor and the first transistor has a gate oxide that is thicker than a gate oxide of the second transistor.

In example 8a the subject matter of Examples 1a-7a can optionally include wherein the first transistor includes a gate terminal connected to at least one of a source and a drain of at least one other transistor.

In example 9a the subject matter of Examples 1a-8a can optionally include wherein the first transistor has a gate oxide equal in thickness to a gate oxide of the second transistor.

In example 10a the subject matter of Examples 1a-9a can optionally include wherein when the voltage of the power supply pins exceeds the second gate oxide breakdown voltage but not the first gate oxide breakdown voltage, the protection block enters a secure mode of operation.

In example 11a the subject matter of Examples 1a-10a can optionally include wherein when the voltage of the power supply pins exceeds the first and second gate oxide breakdown voltages, the protection block enters a failure mode.

In example 12a the subject matter of Examples 1a-11a can optionally include wherein when the voltage of the power supply pins does not meet the predetermined condition, the protection block enters a secure mode of operation.

In example 13a the subject matter of Examples 1a-12a can optionally include wherein when the voltage of the power supply pins exceeds the second gate oxide breakdown voltage but not the first gate oxide breakdown voltage, the protection block enters a secure mode of operation and communicates with at least one of the second function block and a third function block but not the first function block.

In example 14a the subject matter of Examples 1a-13a can optionally include wherein the first transistor is: (a) connected in series with at least one other transistor, and (b) has a first gate oxide breakdown voltage that is greater than a second gate oxide breakdown voltage of the second transistor.

In example 15a the subject matter of Examples 1a-14a can optionally include wherein the protection block includes a voltage divider, comprising the first transistor, to determine whether the voltage of the power supply pins meets the predetermined condition.

In example 16a the subject matter of Examples 1a-15a can optionally include wherein the first and second transistors are metal-oxide semiconductor (MOS) transistors.

Example 17a includes a memory; a wireless interface; a processor, coupled to the memory, and operable to communicate with other devices using the wireless interface; a power supply; power supply pins coupled to the power supply; and a protection block, including a first transistor, to: (a) determine whether voltage from the power supply pins meets a predetermined condition, and (b) in response to determining whether the predetermined condition is met, communicate a first communication to at least one of first and second function blocks; wherein the first function block, coupled to the protection block and the power supply pins, includes a second transistor; wherein the first transistor is at least one of: (a) connected in series with at least one other transistor, and (b) having a first gate oxide breakdown voltage that is greater than a second gate oxide breakdown voltage of the second transistor.

In example 18a the subject matter of Example 17a can optionally include wherein when the predetermined condition is based on whether the voltage is within a predetermined range.

In example 19a the subject matter of Examples 17a-18a can optionally include wherein the first transistor has a first gate oxide breakdown voltage that is greater than a second gate oxide breakdown voltage of the second transistor and the first transistor has a gate oxide that is thicker than a gate oxide of the second transistor.

In example 20a the subject matter of Examples 17a-19a can optionally include wherein the first transistor includes a node connected in series with at least one additional node of at least one other transistor.

In example 21a the subject matter of Examples 17a-20a can optionally include wherein the first transistor is: (a) connected in series with at least one other transistor, and (b)

has a first gate oxide breakdown voltage that is greater than a second gate oxide breakdown voltage of the second transistor.

In example 22a the subject matter of Examples 17a-21a can optionally include wherein the protection block includes a voltage divider, comprising the first transistor, to determine whether the voltage of the power supply pins meets the predetermined condition.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
   power supply pins to couple to a power supply; and
   a protection block, including a first transistor, to: (a) determine whether voltage from at least one of the power supply pins meets a predetermined condition, and (b) in response to determining whether the predetermined condition is met, communicate a first communication to at least one of first or second function blocks;
   wherein the first function block, coupled to the protection block and the power supply pins, includes a second transistor and at least one fuse that corresponds to a security key;
   wherein the first transistor has a first gate oxide breakdown voltage that is greater than a second gate oxide breakdown voltage of the second transistor;
   wherein the protection block is configured such that when the voltage from at least one of the power supply pins exceeds the second gate oxide breakdown voltage but not the first gate oxide breakdown voltage, the protection block enters a secure mode of operation.

2. The apparatus of claim 1, wherein the predetermined condition is based on whether the voltage from at least one of the power supply pins is within a predetermined range.

3. The apparatus of claim 1, wherein the protection block includes at least one Zener diode.

4. The apparatus of claim 3 wherein the at least one Zener diode is configured to prevent a voltage that does not meet the predetermined condition from being supplied to the protection block.

5. The apparatus of claim 1, wherein the power supply is a digital power supply.

6. The apparatus of claim 1, wherein the first transistor has a gate oxide that is thicker than a gate oxide of the second transistor.

7. The apparatus of claim 1, wherein the first transistor includes a gate terminal directly connected to at least one of a source or a drain of at least one other transistor.

8. The apparatus of claim 1, wherein the protection block is configured such that when the voltage from at least one of the power supply pins exceeds the first and second gate oxide breakdown voltages, the protection block enters a failure mode.

9. The apparatus of claim 1, wherein the protection block is configured such that when the voltage from at least one of the power supply pins does not meet the predetermined condition, the protection block enters the secure mode of operation.

10. The apparatus of claim 1, wherein the protection block is configured such that when the voltage from at least one of the power supply pins exceeds the second gate oxide breakdown voltage but not the first gate oxide breakdown voltage, the protection block enters the secure mode of operation and communicates with at least one of the first function block, the second function block, or a third function block but not another of the first, second, or third function blocks.

11. The apparatus of claim 1, wherein the first transistor has a first gate oxide breakdown voltage that is greater than a second gate oxide breakdown voltage of the second transistor.

12. The apparatus of claim 1 wherein the protection block includes a voltage divider, comprising the first transistor, to determine whether the voltage from at least one of the power supply pins meets the predetermined condition.

13. The apparatus of claim 1, wherein the first and second transistors are metal-oxide semiconductor (MOS) transistors.

14. An apparatus comprising:
    power supply pins to couple to a power supply; and
    a protection block, including a first transistor, to: (a) determine whether voltage from at least one of the power supply pins meets a predetermined condition, and (b) in response to determining whether the predetermined condition is met, communicate a first communication to at least one of first or second function blocks;
    wherein the first function block, coupled to the protection block and the power supply pins, includes a second transistor and at least one fuse that corresponds to a security key;
    wherein the first transistor has a first gate oxide breakdown voltage that is greater than a second gate oxide breakdown voltage of the second transistor;
    wherein the first transistor has a gate oxide that is thicker than a gate oxide of the second transistor.

15. The apparatus of claim 14, wherein the predetermined condition is based on whether the voltage from at least one of the power supply pins is within a predetermined range.

16. The apparatus of claim 15, wherein the protection block is configured such that when the voltage from at least one of the power supply pins exceeds the first and second gate oxide breakdown voltages, the protection block enters a failure mode.

17. The apparatus of claim 15, wherein the protection block is configured such that when the voltage from at least one of the power supply pins does not meet the predetermined condition, the protection block enters a secure mode of operation.

18. An apparatus comprising:
    power supply pins to couple to a power supply; and
    a protection block, including a first transistor, to: (a) determine whether voltage from at least one of the power supply pins meets a predetermined condition, and (b) in response to determining whether the predetermined condition is met, communicate a first communication to at least one of first or second function blocks;
    wherein the first function block, coupled to the protection block and the power supply pins, includes a second transistor and at least one fuse that corresponds to a security key;
    wherein the first transistor has a first gate oxide breakdown voltage that is greater than a second gate oxide breakdown voltage of the second transistor;
    wherein the protection block is configured such that when the voltage from at least one of the power supply pins exceeds the second gate oxide breakdown voltage but not the first gate oxide breakdown voltage, the protection block causes a function block to enter a secure mode of operation.

19. The apparatus of claim 18, wherein the first transistor has a gate oxide that is thicker than a gate oxide of the second transistor.

20. The apparatus of claim 18, wherein the protection block is configured such that when the voltage from at least one of the power supply pins exceeds the first and second gate oxide breakdown voltages, the protection block enters a failure mode.

21. The apparatus of claim 18, wherein the protection block is configured such that when the voltage from at least one of the power supply pins does not meet the predetermined condition, the protection block enters the secure mode of operation.

22. The apparatus of claim 18, wherein the predetermined condition is based on whether the voltage from at least one of the power supply pins is within a predetermined range.

\* \* \* \* \*